Sept. 4, 1934.  J. S. JONES  1,972,147
ROOF HOOK
Filed Feb. 10, 1934
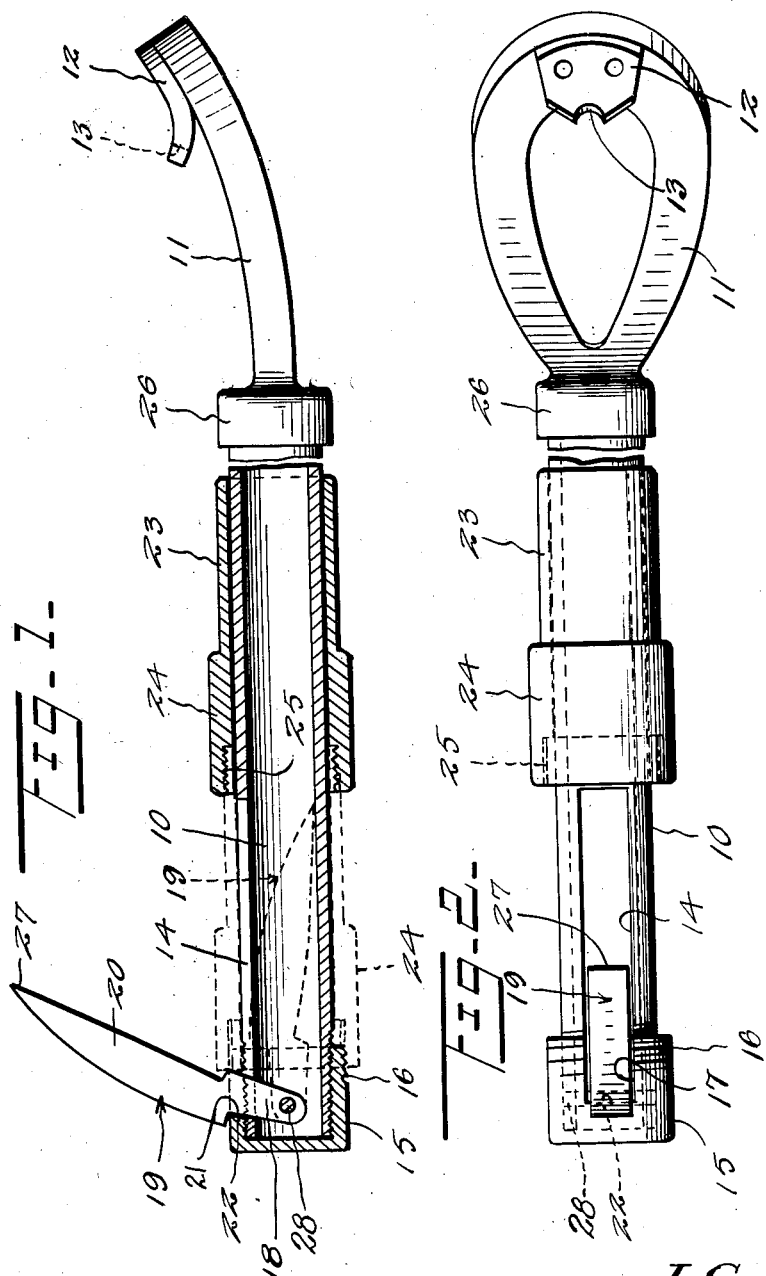
Inventor
J. S. Jones
By Watson E. Coleman
Attorney Patented Sept. 4, 1934

1,972,147

UNITED STATES PATENT OFFICE 1,972,147

ROOF HOOK

Jesse S. Jones, Jefferson City, Mo., assignor of one-half to Clyde O. Gouge, Jefferson City, Mo.

Application February 10, 1934, Serial No. 710,742

4 Claims. (Cl. 306—2)

This invention relates to hooks and more particularly to a hook adapted for use in constructing or removing roofing material, and also includes a means for uncoupling hose connections.

An object of this invention is to provide a combination tool which is of a collapsible nature wherein a hook is provided at one end of the device and a spanner wrench at the opposite end, which opposite end also is constructed in the form of a handle for use when the device is used with the hook end in operative position.

The above and various other objects and advantages of this invention will in part be described and in part be understood from the following detailed description of the present preferred embodiment, the same being illustrated in the accompanying drawing wherein:—

Figure 1 is a longitudinal section partly broken away and partly in detail of a device constructed according to the preferred embodiment of this invention.

Figure 2 is a top plan view of the device.

Referring to the drawing wherein like numerals of reference designate corresponding parts throughout the views, the numeral 10 designates generally a hollow bar which is provided at its inner end with a handle in the form of a loop 11. The loop 11 is provided with a lug 12 having a notch 13 confronting the inside of the loop 11, and this lug 12 is adapted to engage an outstanding pin or nut provided in a hose coupling so that the coupling may be tightened or loosened, as may be desired.

The tubular member 10 is provided at its outer end with an elongated slot 14 and a plug 15 is secured to the outer end of the tubular member 10 and is provided on its inner end with threads 16. The plug 15 is also cut out, as at 17, so as to receive the shank end 18 of a hook member 19. The bill portion 20 of the hook 19 is adapted to be disposed within the recess or opening 14 when the hook 19 is in collapsed or inoperative position. The shank 18 at its forward side is cut out, as at 21, and this cut out portion 21 engages a complementary cut out portion 22 in the plug 15 so that the hook 19, when in operative position, will be inclined rearwardly on the desired angle.

A sleeve 23 is loosely mounted on the tubular member 10, and is provided at its outer end with an enlarged sleeve 24, which is threaded on the inside, as at 25, and these threads 25 are adapted to engage the threads 16. The tubular member 10 at its inner end is provided with a collar 26, which is fixed to the tubular member and acts as a stop member for the sleeve 23. Preferably, the outer end of the bill 20 terminates in a point, as at 27, so that the hook 19 may be forced beneath shingles, boards or the like, so as to lift the shingles or boards or for any other purpose for which the tool may be used.

In the use and operation of this device, when the device is in collapsed or closed position, the hook 19 is disposed within the tubular member 10 in the opening or slot 14. In this position, the sleeve 23 overlies the forward end of the tubular member 10 and covers the opening 14. The threaded sleeve 24 is threaded onto the plug 15 and in this manner holds the hook 19 against movement.

When it is desired to move the hook 19 into operative position, the sleeves 23 and 24 are released from the plug 15 and the hook 19 swung outwardly on the pivotal mounting 28 provided in the plug 15. The sleeves 23 and 24 are then returned to the forward end of the tubular member 10 and again threaded onto the threads 16 in which position the forward end of the sleeve 24 engages against the rear side of the shank 18 and thereby holds the hook 19 against rocking movement.

When it is desired to use the tool herein described as a spanner wrench, the hook 19 may be collapsed or may be left in operative position, as may be desired, and the coupling engaging member 12 carried by the looped handle 11 engaged with the coupling. In this use, the tubular member 10 constitutes the handle for the spanner wrench and the loop 11 is of a size sufficient both in length and width to permit the engagement of the member 12 with the coupling.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A device as set forth, comprising a tubular member having an elongated opening at an end thereof, a hook member, means for pivotally mounting the hook member adjacent said end of the tubular member for movement to a collapsed position within said opening or to an operative position at an angle to the length of the tubular member, a cap secured to said end of the tubular member and having peripheral threads, and means engaging the threads of the cap for holding said hook member in operative or collapsed position.

2. A device as set forth, comprising a tubular member having an elongated opening in the side wall thereof adjacent the forward end, a hook member adapted to be disposed within the tubular member when in collapsed position and movable through the opening in the tubular member, means for mounting the hook member on the forward end of the tubular member for movement into operative or inoperative position, threads carried by said mounting means, and a sleeve loosely carried by the tubular member, said sleeve having threads on the forward end thereof for engagement with the threads of the hook mounting means, the forward end of the sleeve coacting with the mounting means to hold the hook member in operative position on an angle to the length of the tubular member.

3. A device as set forth, comprising a tubular member having an elongated opening adjacent the forward end thereof, a hook member, mounting means for mounting the hook member on the forward end of the tubular member for movement into collapsed position through the opening of the tubular member or operative position on an angle to the length of the tubular member, threads carried by said mounting means, a sleeve slidable on the tubular member, a second sleeve carried by said first sleeve, threads carried by said second sleeve for engagement with said first threads for holding the hook member in operative or collapsed position.

4. A device as set forth, comprising a tubular member having an opening adjacent the forward end thereof, a hook member, mounting means engaging the forward end of the tubular member and engaging the hook member to mount the hook member on the forward end of the tubular member, threads carried by the inner end of said mounting means, a sleeve slidable on the tubular member, a second sleeve carried by the forward end of said first sleeve and having a diameter greater than the diameter of the first sleeve, threads on the interior of the second sleeve engageable with the threads on said mounting means, and a collar carried by the tubular member adjacent the inner end thereof to limit the sliding movement of said first sleeve.

JESSE S. JONES.